United States Patent
Sigamani et al.

(10) Patent No.: US 10,224,828 B1
(45) Date of Patent: Mar. 5, 2019

(54) DC-DC POWER CONVERTERS AND METHODS OF OPERATING DC-DC POWER CONVERTERS

(71) Applicant: Astec International Limited, Kowloon (HK)

(72) Inventors: James Sigamani, Pasig (PH); Antonio Remetio Soleño, Mandaluyong (PH); Kenneth Rivera Lazo, Dasmariñas (PH)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/989,025

(22) Filed: May 24, 2018

(51) Int. Cl.
*H02M 3/335* (2006.01)
*H02M 1/00* (2006.01)

(52) U.S. Cl.
CPC ..... *H02M 3/33592* (2013.01); *H02M 3/3353* (2013.01); *H02M 3/33507* (2013.01); *H02M 2001/0009* (2013.01)

(58) Field of Classification Search
CPC . H02M 2001/0032; H02M 2001/0035; H02M 3/33576; H02M 3/33592
USPC ............ 363/21.12–21.14, 21.18, 78, 89
See application file for complete search history.

(56) References Cited

U.S. PATENT DOCUMENTS

| | | | | |
|---|---|---|---|---|
| 2008/0002441 | A1* | 1/2008 | Allinder | H02M 3/33592 363/21.14 |
| 2009/0086513 | A1* | 4/2009 | Lombardo | H02M 3/33507 363/21.12 |
| 2009/0257250 | A1* | 10/2009 | Liu | H02M 3/33592 363/21.06 |
| 2011/0205764 | A1* | 8/2011 | Sheng | H02M 1/36 363/21.09 |
| 2014/0112031 | A1* | 4/2014 | Chen | H02M 3/33592 363/21.14 |

OTHER PUBLICATIONS

Zhang et al., Design Considerations and Performance Evaluations of Synchronous Rectification in Flyback Converters, Virginia Polytechnic Institute and State University, Delta Power Electronics, 1997 (8 pages).

* cited by examiner

*Primary Examiner* — Gary Nash
(74) *Attorney, Agent, or Firm* — Harness, Dickey & Pierce, P.L.C.

(57) ABSTRACT

A DC-DC power converter includes an input, an output, a transformer, a primary field-effect transistor (FET), and a synchronous rectifier. The synchronous rectifier includes a drain that experiences multiple resonant voltage valleys during each dead-time period of the converter. The converter further includes a synchronous rectifier drive circuit configured to turn on and turn off the synchronous rectifier, and a primary control circuit. The primary control circuit is configured to operate the primary FET in a valley skipping mode, and to transmit a drive signal to the synchronous rectifier drive circuit to turn on the synchronous rectifier during a specified one of the multiple resonant voltage valleys to generate a negative current through the synchronous rectifier. Methods of operating a DC-DC power converter are also disclosed.

23 Claims, 9 Drawing Sheets

US 10,224,828 B1

DC-DC POWER CONVERTERS AND METHODS OF OPERATING DC-DC POWER CONVERTERS

FIELD

The present disclosure relates to DC-DC power converters and methods of operating DC-DC converters.

BACKGROUND

This section provides background information related to the present disclosure which is not necessarily prior art.

Flyback converters are commonly used in low-power applications because they can operate at a wide input voltage range, can provide isolation, require less components, etc. Among flyback converters, variable frequency flyback converters, which are commonly known as quasi-resonant (QR) flyback converters, operate at lower frequencies during full load conditions and increase their operating frequency as the load decreases.

During switch turn-on in a flyback converter, power may be dissipated in the switch through turn-on loss and conduction loss. Quasi-resonant flyback converters can eliminate or partially eliminate turn-on losses by using a valley-switching mode of operation. In quasi-resonant operation, energy stored in a primary MOSFET drain capacitor (i.e., an equivalent capacitance), resonates through a magnetizing inductance of a transformer. A controller can detect a lowest valley of the resonating voltage and turn on the primary MOSFET during the lowest valley to reduce turn-on losses.

During quasi-resonant operation, turn-on loss of the primary MOSFET may be fully eliminated (during full zero-voltage switching (ZVS), or partially eliminated (during partial ZVS). Full ZVS may or may not be achieved based on the input voltage and a reflected output voltage. For example, ZVS operation is not achieved when the reflected output voltage is lower than a DC input voltage.

SUMMARY

This section provides a general summary of the disclosure, and is not a comprehensive disclosure of its full scope or all of its features.

According to one aspect of the present disclosure, a DC-DC power converter includes an input for receiving a DC input voltage from a voltage source, an output for supplying a DC output voltage to a load, and a transformer coupled between the input and the output. The transformer has a primary winding and a secondary winding. The converter also includes a primary field-effect transistor (FET) coupled to selectively conduct current through the primary winding of the transformer, and a synchronous rectifier coupled to selectively conduct current through the secondary winding of the transformer. The synchronous rectifier includes a drain that experiences multiple resonant voltage valleys during each dead-time period of the converter. The converter further includes a synchronous rectifier drive circuit configured to turn on and turn off the synchronous rectifier, and a primary control circuit. The primary control circuit is configured to operate the primary FET in a valley skipping mode, and to transmit a drive signal to the synchronous rectifier drive circuit to turn on the synchronous rectifier during a specified one of the multiple resonant voltage valleys to generate a negative current through the synchronous rectifier.

According to another aspect of the present disclosure, a method of operating a DC-DC power converter is disclosed. The converter includes an input, an output, and a transformer coupled between the input and the output. The transformer has a primary winding and a secondary winding. The converter also includes a primary field-effect transistor (FET) coupled to selectively conduct current through the primary winding, and a synchronous rectifier coupled to selectively conduct current through the secondary winding. The synchronous rectifier includes a drain that experiences multiple resonant voltage valleys during each dead-time period of the converter. The converter further includes a primary control circuit and a synchronous rectifier drive circuit. The method includes operating, by the primary control circuit, the primary FET in a valley skipping mode, and transmitting, by the primary control circuit, a drive signal to the synchronous rectifier drive circuit to turn on the synchronous rectifier during a specified one of the multiple resonant voltage valleys to generate a negative current through the synchronous rectifier.

According to yet another aspect of the present disclosure, a DC-DC power converter includes an input for receiving a DC input voltage from a voltage source, an output for supplying a DC output voltage to a load, and a transformer coupled between the input and the output. The transformer has a primary winding and a secondary winding. The converter also includes a primary field-effect transistor (FET) coupled to selectively conduct current through the primary winding of the transformer. The primary FET includes a drain that experiences multiple resonant voltage valleys during each dead-time period of the converter. The converter further includes a synchronous rectifier coupled to selectively conduct current through the secondary winding of the transformer, and means for operating the primary FET in a valley skipping mode by turning on the primary FET during a second or subsequent one of multiple resonant voltage valleys during each dead-time period of the converter, and generating a negative current in the secondary winding of the transformer during one or more of the multiple resonant voltage valleys during each dead-time period of the converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
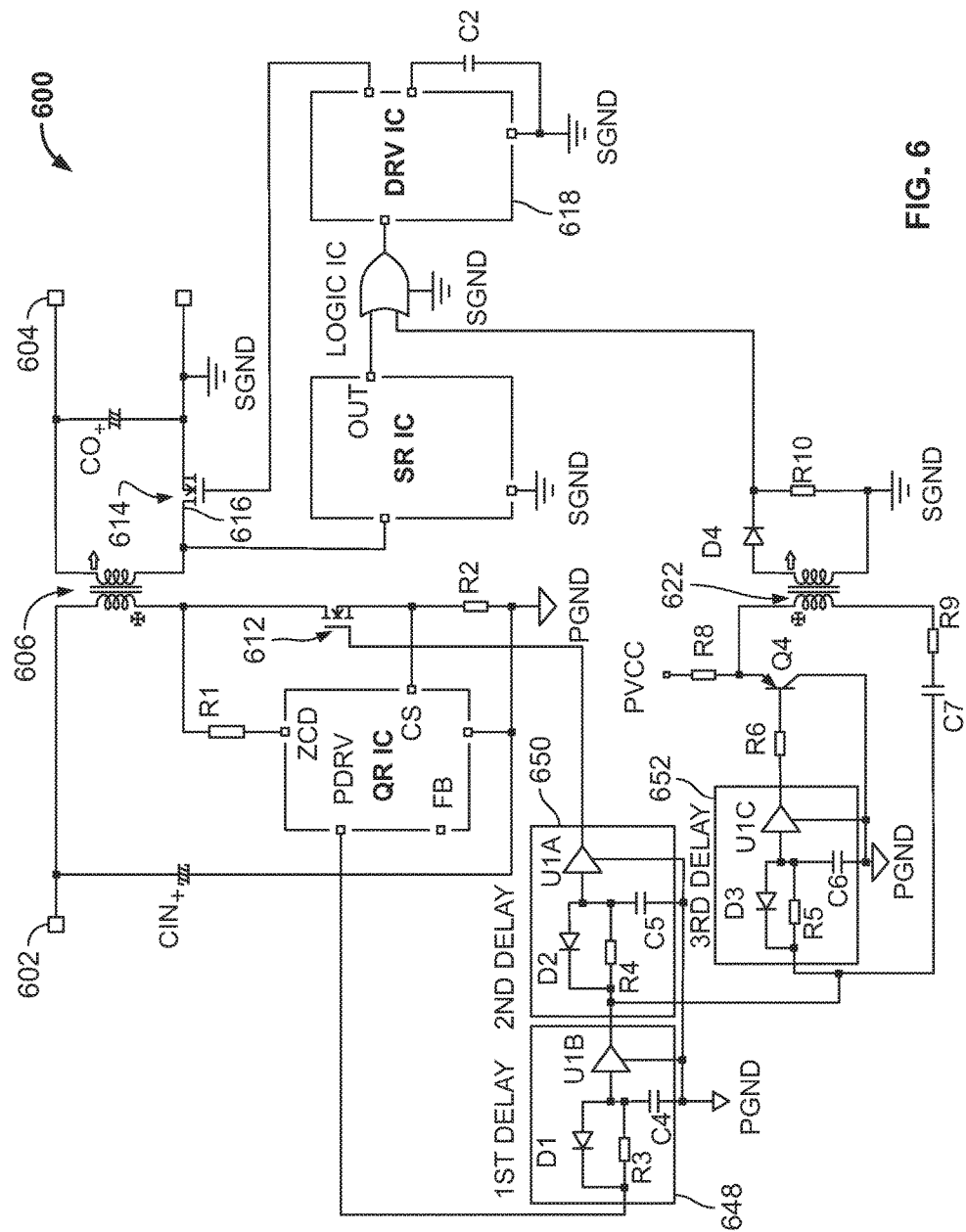

FIG. 6 a circuit diagram of an isolated DC-DC flyback converter having three delay circuit blocks, according to yet another example embodiment of the present disclosure.

Figure 7:
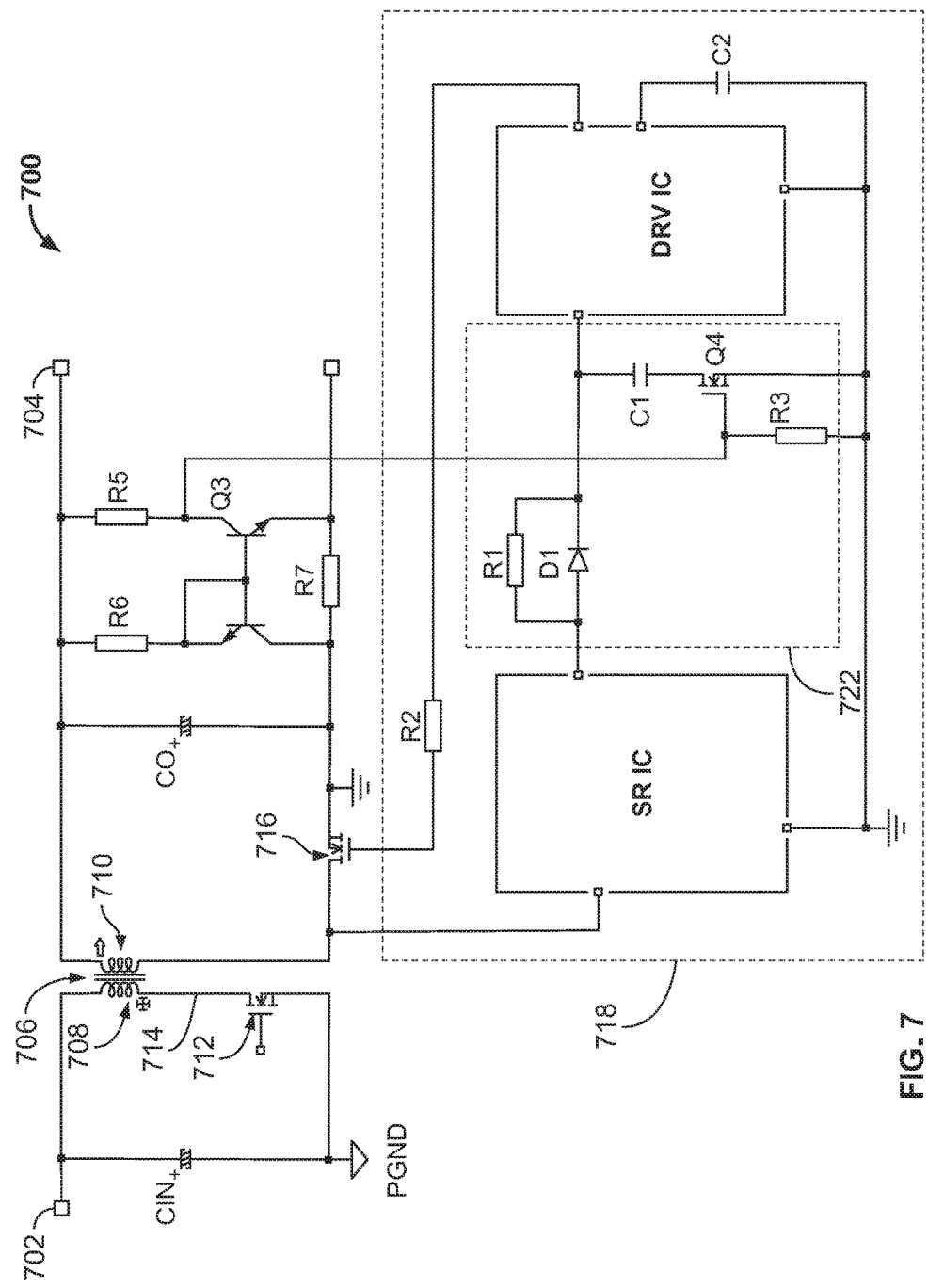

FIG. 7 is a circuit diagram of an isolated DC-DC flyback power converter including a delay circuit, according to another example embodiment of the present disclosure.

Figure 8:
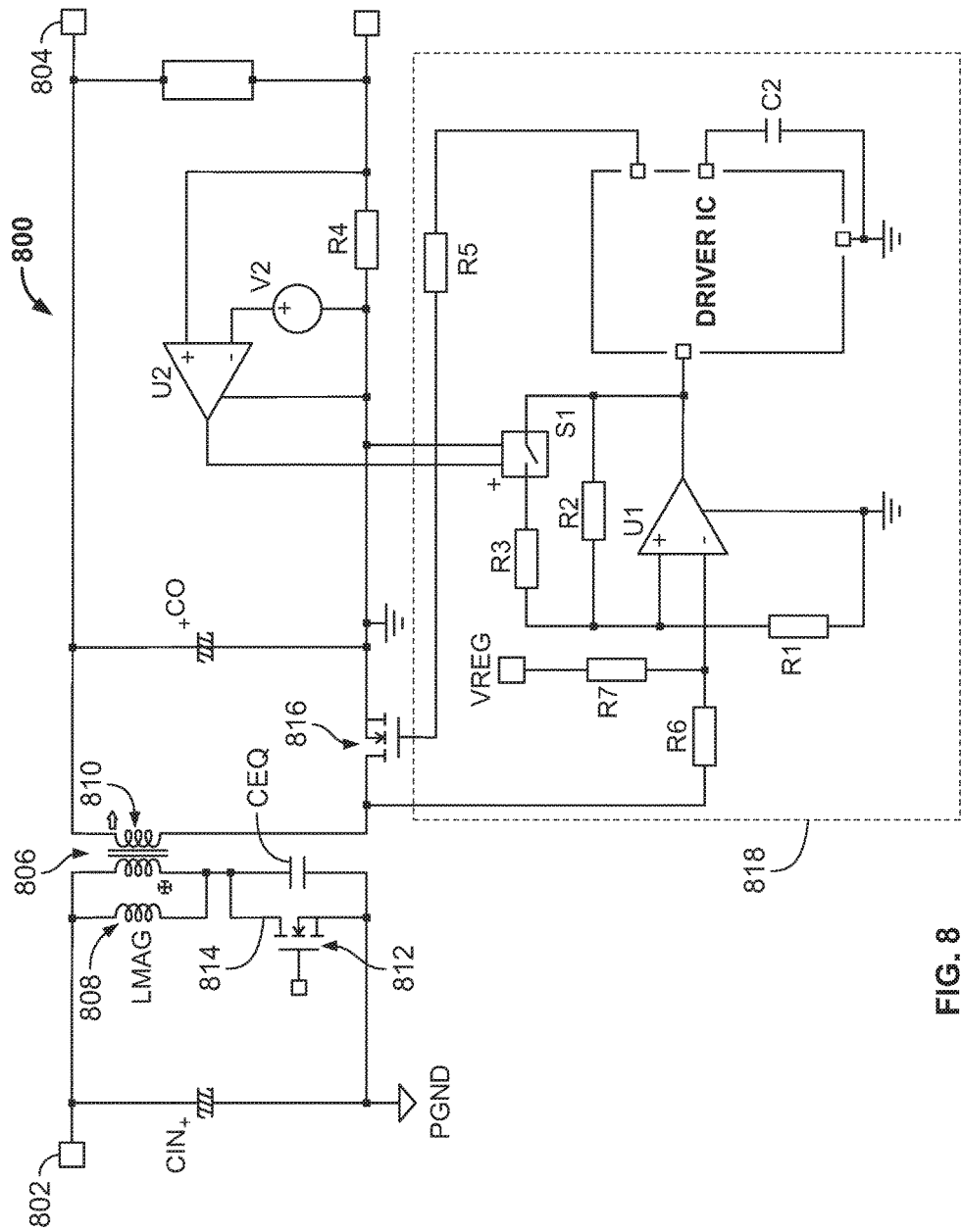

FIG. 8 is a circuit diagram of an isolated DC-DC flyback power converter including a comparator, according to yet another example embodiment of the present disclosure.

Figure 9:
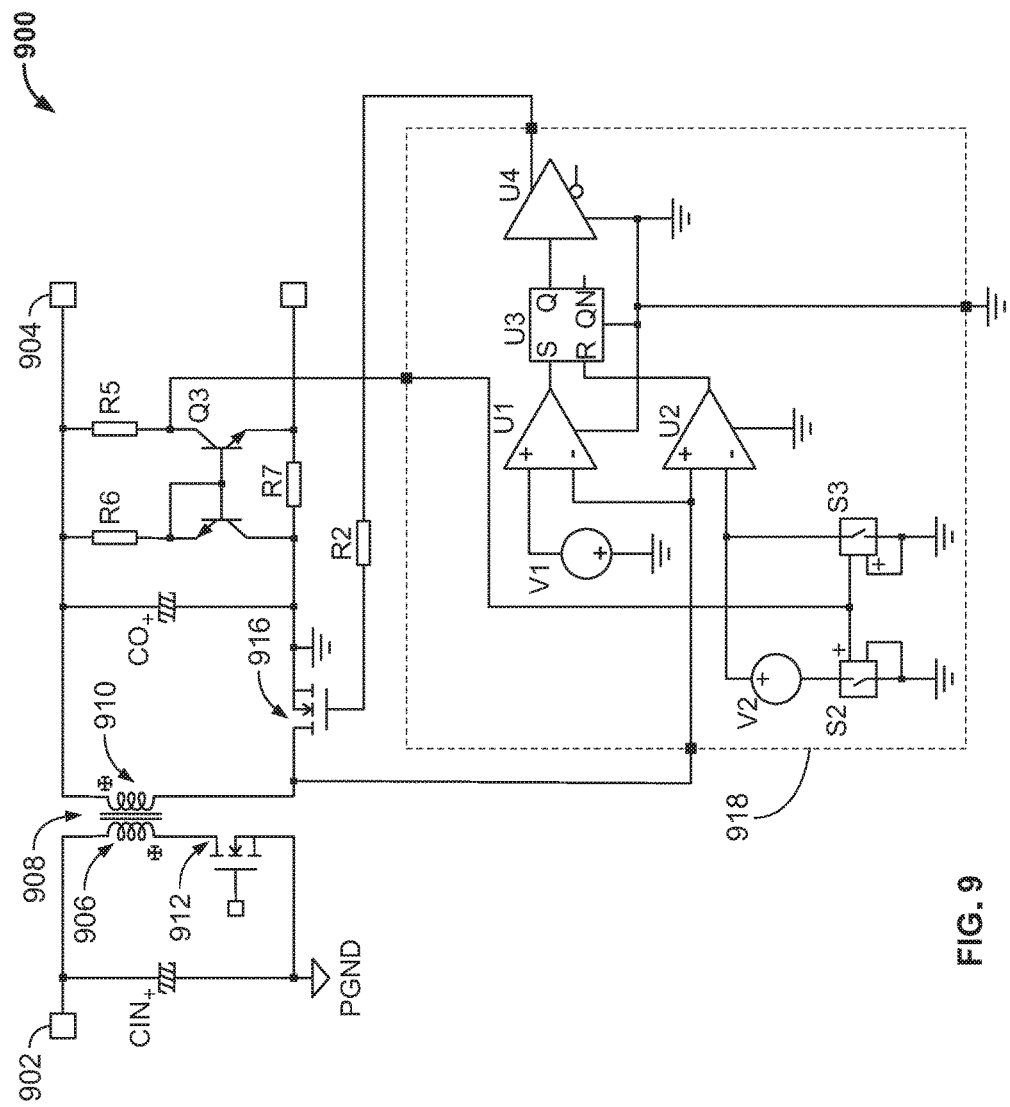

FIG. 9 is a circuit diagram of an isolated DC-DC flyback power converter including an integrated control circuit, according to a further example embodiment of the present disclosure Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The entire disclosure of application Ser. No. 15/988,984, entitled "DC-DC CONVERTERS INCLUDING A VALLEY SKIPPING MODE AND METHODS OF OPERATING DC-DC POWER CONVERTERS," to Antonio Remetio Soleno and Kenneth Rivera Lazo, filed May 24, 2018, is hereby incorporated by reference.

Figure 1:
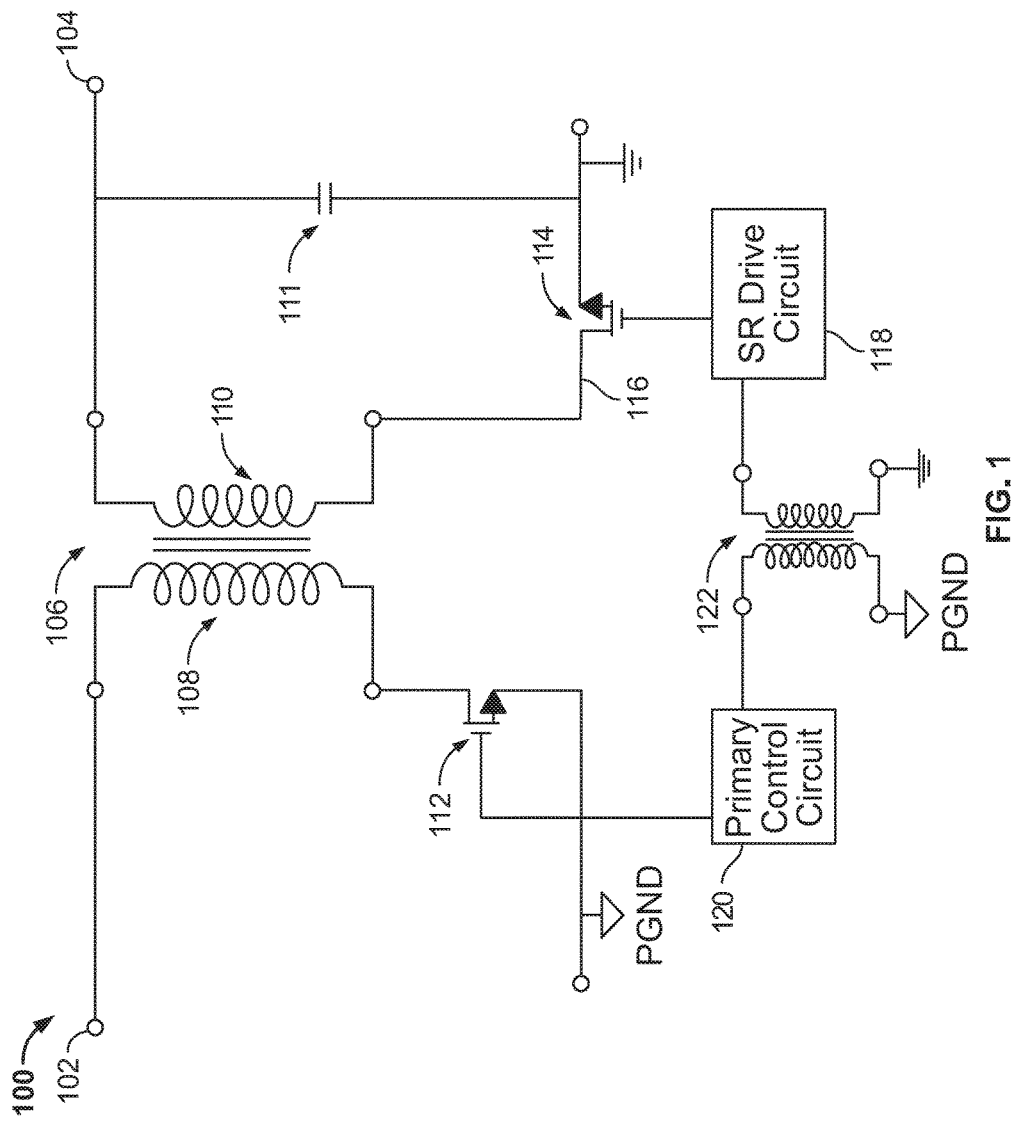
FIG. 1 is a block diagram of an isolated DC-DC flyback converter, according to one example embodiment of the present disclosure.

An isolated DC-DC flyback power converter according to one example embodiment of the present disclosure is illustrated in FIG. 1 and indicated generally by reference number 100. The converter 100 includes an input 102 for receiving a DC input voltage from a voltage source, an output 104 for supplying a DC output voltage to a load, and a transformer 106 coupled between the input 102 and the output 104. The transformer 106 has a primary winding 108 and a secondary winding 110.

The converter 100 also includes a primary field-effect transistor (FET) 112 coupled to selectively conduct current through the primary winding 108 of the transformer 106.

A synchronous rectifier 114 is coupled to selectively conduct current through the secondary winding 110 of the transformer 106.

As shown in FIG. 1, the converter 100 further includes a synchronous rectifier drive circuit 118 configured to turn on and turn off the synchronous rectifier 114, and a primary control circuit 120. The primary control circuit 120 is configured to operate the primary FET 112 in a valley skipping mode, and to transmit a drive signal to the synchronous rectifier drive circuit 118 to turn on the synchronous rectifier 114 during a specified one of the multiple resonant voltage valleys to generate a negative current through the synchronous rectifier 114.

The synchronous rectifier 114 includes a drain 116 that experiences multiple resonant voltage valleys during each dead-time period of the converter 100 (e.g., a time period of one or more switching cycles where both the primary FET 112 and the synchronous rectifier 114 are turned off, thereby causing multiple resonant voltage oscillations to occur across the drain of the primary FET 112, etc.). The converter 100 includes an optional isolator 122 coupled between the primary control circuit 120 and the synchronous rectifier drive circuit 118. In that case, the primary control circuit 120 is configured to transmit the drive signal through the isolator 122 to the synchronous rectifier drive circuit 118. Although FIG. 1 illustrates the isolator 122 as a transformer (e.g., a gate-drive transformer), other embodiments may include other suitable isolators (e.g., an optocoupler, etc.). The converter 100 also includes an output capacitor 111.

Figure 2:
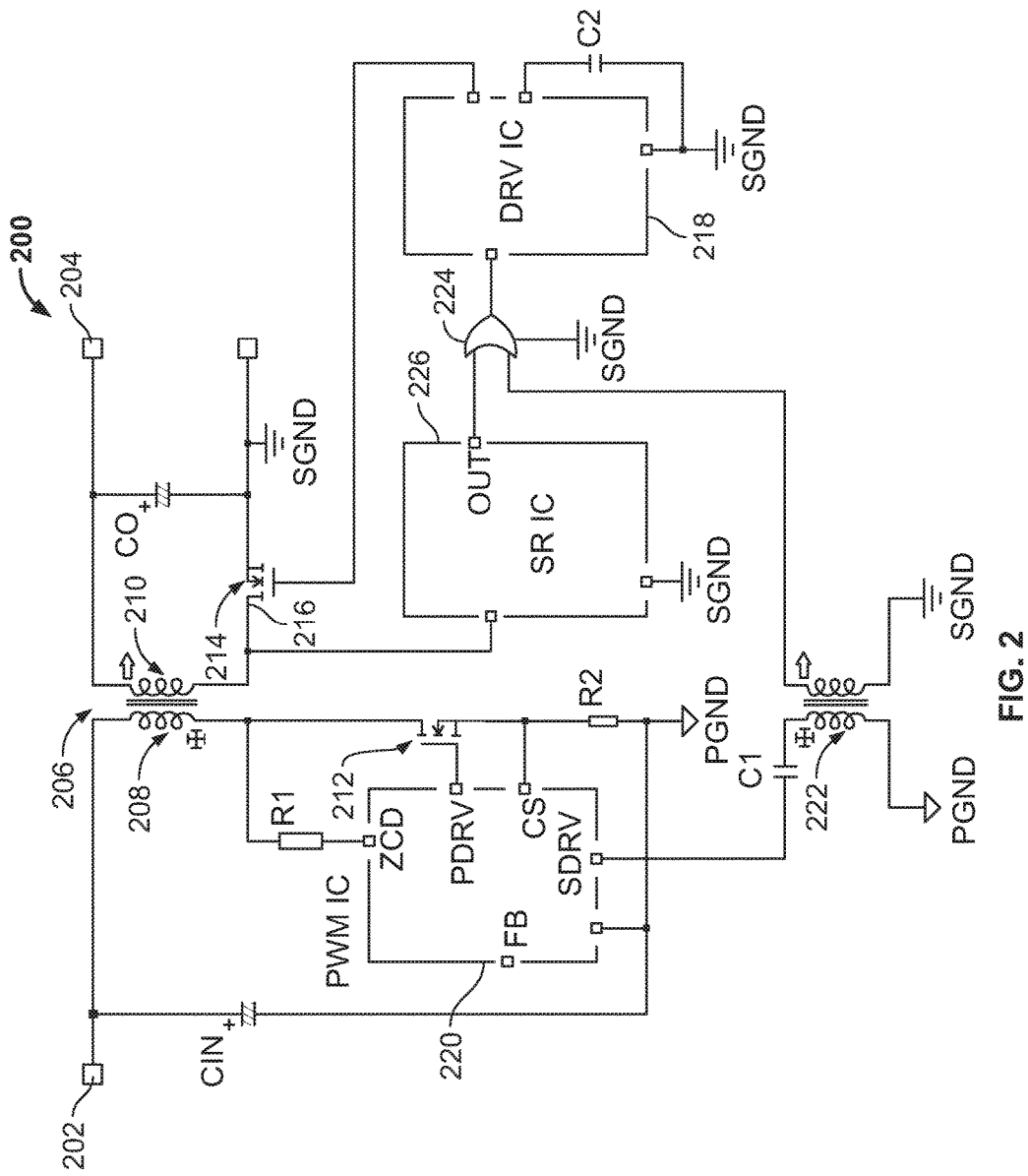
FIG. 2 is a circuit diagram of an isolated DC-DC flyback converter including a logical OR-gate, according to another example embodiment of the present disclosure.

FIG. 2 illustrates an isolated DC-DC flyback converter 200 according to another example embodiment of the present disclosure. The converter 200 includes an input 202, an output 204, and a transformer 206 coupled between the input 202 and the output 204. The transformer 206 includes a primary winding 208 and a secondary winding 210. Although FIG. 2 illustrates the transformer 206 as including a single primary winding 208 and secondary winding 210, other embodiments may include multiple primary windings, multiple secondary windings, etc.

The converter 200 also includes a primary field-effect transistor (FET) 212, and a synchronous rectifier 214. The synchronous rectifier 214 includes a drain 216 that experiences multiple resonant voltage valleys during each dead-time period of the converter 200.

As shown in FIG. 2, the converter 200 further includes a synchronous rectifier drive circuit 218 configured to turn on and turn off the synchronous rectifier 214, and a primary control circuit 220. The primary control circuit 220 is configured to operate the primary FET 212 in a valley skipping mode, and to transmit a drive signal to the synchronous rectifier drive circuit 218 to turn on the synchronous rectifier 214 during a specified one of the multiple resonant voltage valleys to generate a negative current through the synchronous rectifier 214. The primary control circuit 220 and the synchronous rectifier driver circuit 218 may be considered a means for operating the primary FET 212 in a valley skipping mode, and generating a negative current through the synchronous rectifier 214.

The converter 200 includes an isolation transformer 222 coupled between the primary control circuit 220 and the synchronous rectifier drive circuit 218. The primary control circuit 220 is configured to transmit the drive signal through the isolation transformer 222 to the synchronous rectifier drive circuit 218.

The converter 200 also includes a logical OR-gate 224 having a first input and a second input, and an integrated circuit 226. The integrated circuit 226 has an input coupled to detect a current of the secondary winding 210 of the transformer 206, and an output coupled to transmit a control signal to turn on and turn off the synchronous rectifier 214 according to the detected current.

The control signal output by the integrated circuit 226 is supplied to one of the inputs of the logical OR-gate 224, and the drive signal transmitted by the primary control circuit 220 (via the isolation transformer 222) is supplied to the other input of the logical OR-gate 224. In this way, the integrated circuit 226 can control turn on of the synchronous rectifier 214 during normal operation, and the primary control circuit 220 can also turn on the synchronous rectifier 214 during a specified resonant voltage valley to facilitate ZVS switching of the primary FET 212.

Figure 3:
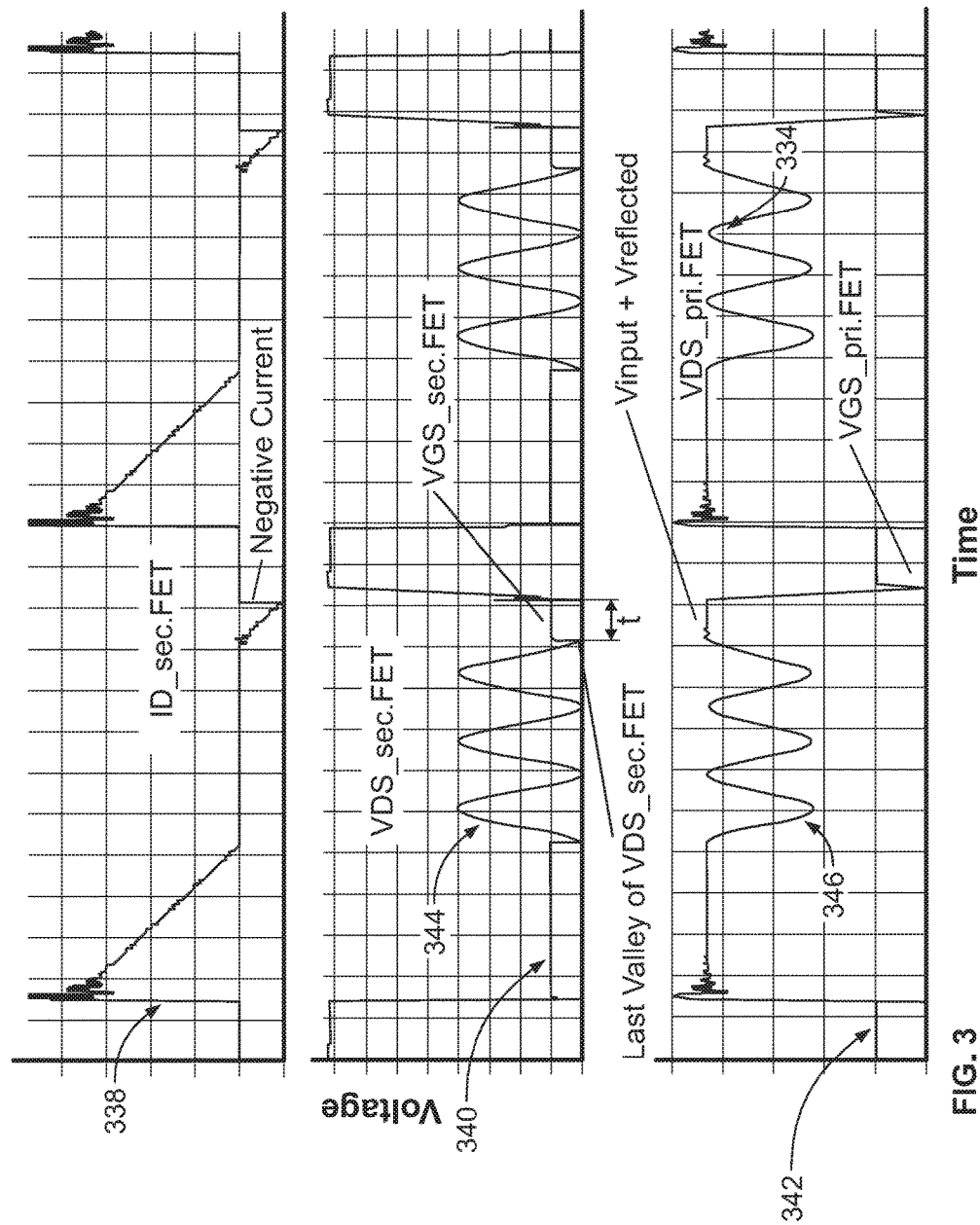
FIG. 3 is a line graph of example voltage and current waveforms of the converter of FIG. 2.

FIG. 3 illustrates example voltage and current waveforms of the converter 200. As shown in FIG. 3, a drain current 338 of the synchronous rectifier 214 decreases during a period where the control signal 340 for the synchronous rectifier 214 is on and the control signal 342 for the primary FET 212 is off.

When the control signal 340 turns off the synchronous rectifier 214 to commence a dead-time of the converter 200 (e.g., when both the synchronous rectifier 214 and the primary FET 212 are off), multiple resonant voltage valleys occur on the drain-source voltage 344 of the synchronous rectifier 214, and also on the drain-source voltage 346 of the primary FET 212.

At a fourth valley of the drain-source voltage 344 of the synchronous rectifier 214, the synchronous rectifier 214 is turned on for a time period t according to a drive signal from the primary control circuit 220. This creates a negative drain current 338 through the synchronous rectifier 214, which facilitates ZVS turn on of the primary FET 212 via the control signal 342. The time period t may be considered as a specified reverse current duration.

Figure 4:
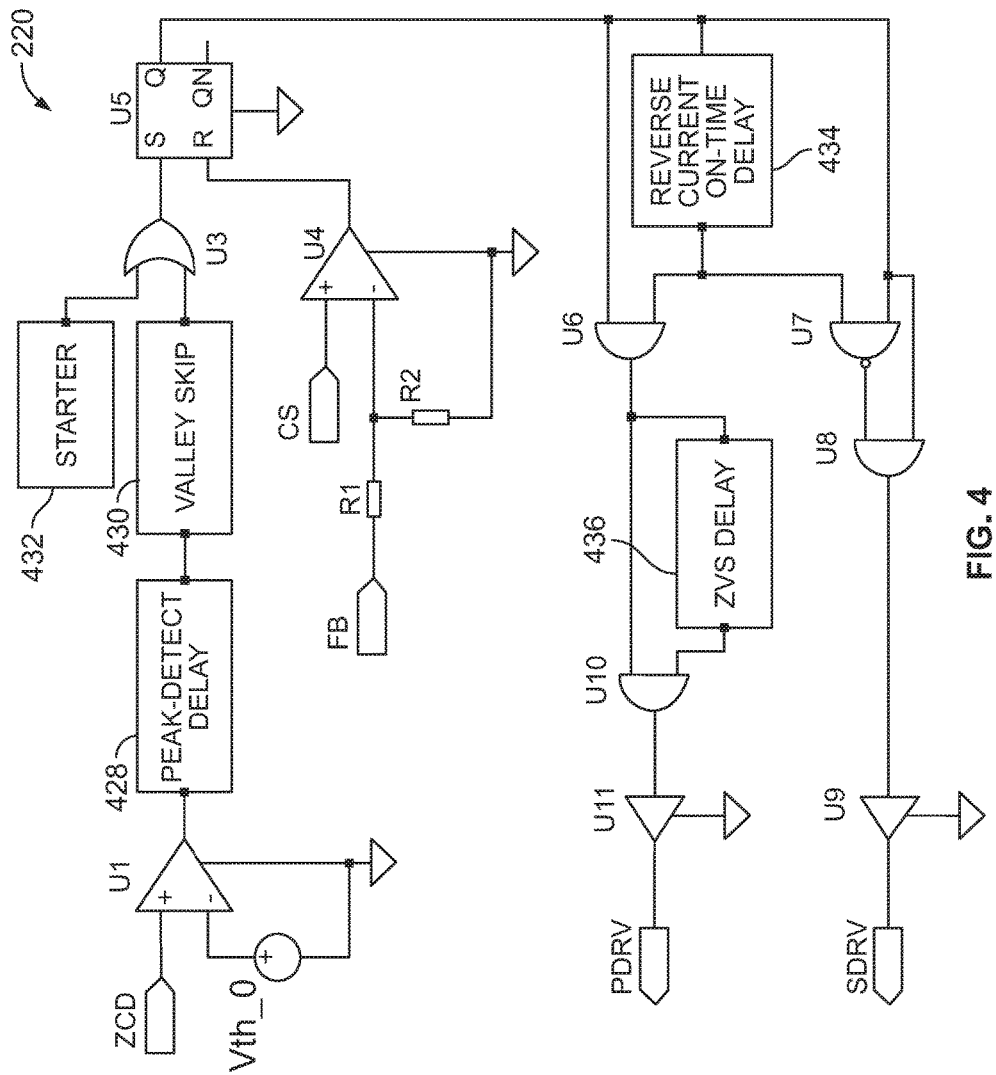
FIG. 4 is a circuit diagram of the primary control circuit of FIG. 2.

FIG. 4 is a block schematic circuit diagram example of internal components of the primary control circuit 220 of FIG. 2. The primary control circuit 220 receives a zero-current detection (ZCD) signal input, indicative of zero voltage crossings of the voltage on the primary winding 208 of the transformer 206, which corresponds to a voltage of the drain of the primary FET 212. In some embodiments, an auxiliary winding could be used for ZCD. The ZCD signal can detect a voltage valley on the drain of the primary FET 212 by detecting the primary winding 208, an auxiliary winding, etc. A comparator U1 compares the ZCD signal to a low-voltage threshold (Vth_0), and outputs a logical high value to a peak detect delay circuit 428 when the ZCD signal exceeds the low-voltage threshold.

The peak detect delay circuit 428 is configured to introduce a specified peak delay period before the primary control circuit 220 transmits the drive signal to the synchronous rectifier 214. The specified peak delay period corresponds to a time difference between a zero crossing of the voltage on the primary winding 208 (which may be connected with the dotted end of the transformer 206 in FIG. 2), and a peak value of the voltage on the primary winding 208 of the transformer 206 (which may correspond to a voltage on the drain of the primary FET 212). Waiting until the voltage on the primary winding 208 reaches a peak value allows the synchronous rectifier 214 to be turned on during a resonant voltage valley on the drain 216 of the synchronous rectifier 214, because resonant voltage valleys on the secondary winding 210 of the transformer 206 correspond to resonant voltage peaks on the primary winding 208 of the transformer 206.

After the specified peak delay period, the peak detect delay circuit 428 outputs a signal to a valley skipping circuit 430. For example, the peak detect delay circuit 428 may wait until a voltage on the drain of the primary FET 212 reaches a peak value before outputting the signal to the valley skipping circuit 430, as determined by the specified peak delay period. The valley skipping circuit 430 is configured to inhibit transmission of the drive signal to the synchronous rectifier drive circuit 218 until the specified one of the multiple resonant voltage valleys occurs. The valley skipping circuit 430 may implement the valley-skipping (e.g., frequency foldback) operation of the primary FET 212 as a load-dependent function, a line-dependent function, etc.

Figure 5:
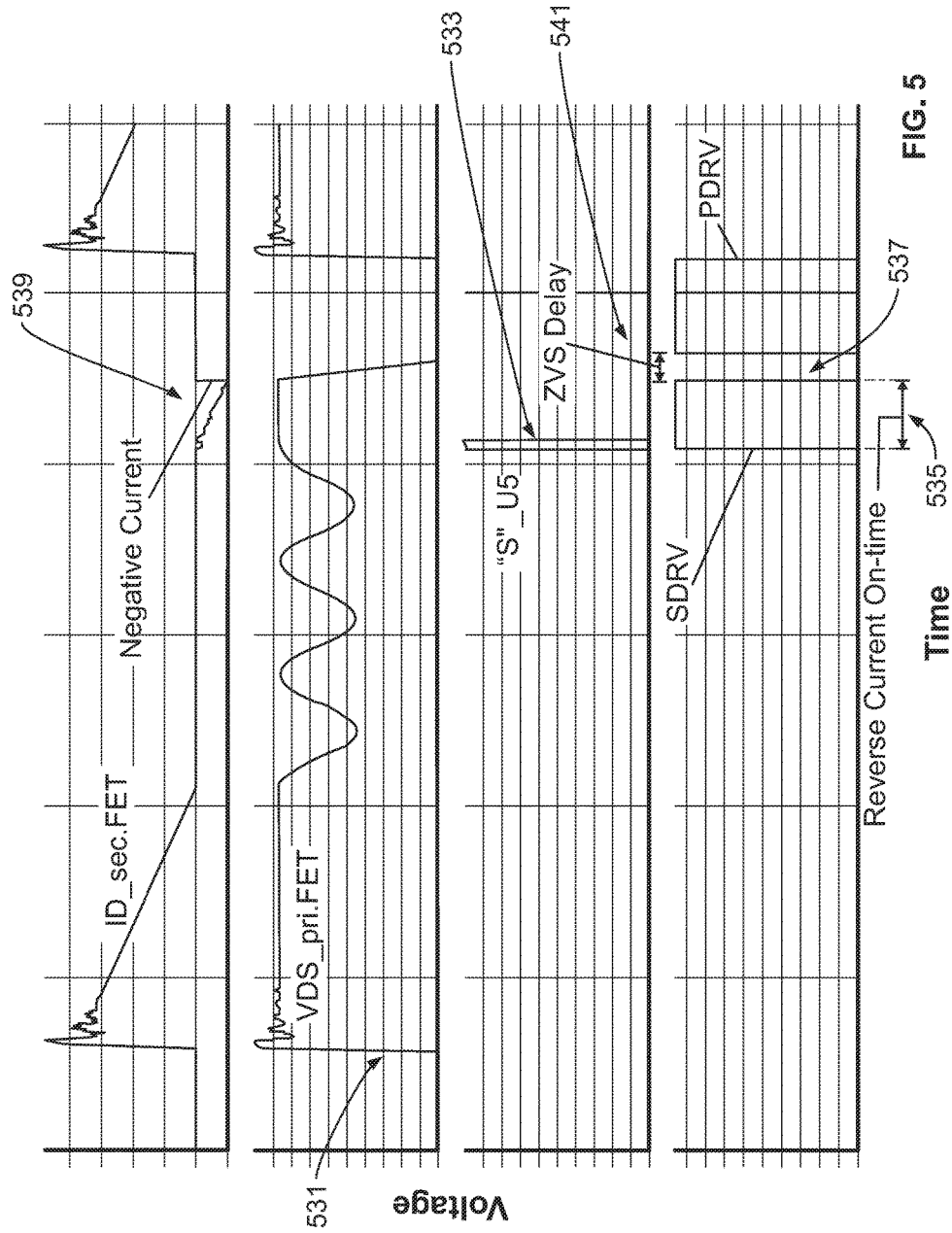
FIG. 5 is a line graph of additional example voltage and current waveforms of the converter of FIG. 2.

In some embodiments, the valley skipping circuit 430 may determine a number of resonant voltage valleys to skip before turning on the primary FET 212, and the valley skipping circuit 430 may be configured to output the drive signal once the specified number of resonant voltage valleys occurs. For example, the valley skipping circuit 430 may wait to output the drive signal until a second resonant voltage valley, a third resonant voltage valley, a fourth resonant voltage valley, etc. FIG. 5 illustrates an example case where valley skipping circuit 430 waits until a third peak of a drain-source voltage 531 of the primary FET 212 before transmitting the drive signal 537 to the synchronous rectifier drive circuit 218.

A starter circuit 432 is coupled to a logical OR-gate U3 along with the output of the valley skipping circuit 430. The starter circuit 432 can initiate a first pulse of the primary control circuit 220 during a start-up condition when the ZCD signal is not yet available, can supply a pulse during a steady-state condition if the ZCD signal fails after a defined ZCD delay time period, etc.

As shown in FIG. 4, the primary control circuit 220 includes a reverse current on-time delay circuit 434 that receives an output signal from the valley skipping circuit 430 (via the latch U5). The reverse current on-time delay circuit 434 is configured to transmit the drive signal to the synchronous rectifier drive circuit 218 for a specified reverse current duration. The specified reverse current duration may be a pulse width, on-time, etc. for driving the synchronous rectifier 214.

For example, the specified reverse current duration may be specified as a duration sufficient to build up the negative current in the synchronous rectifier 214 to a specified value before the synchronous rectifier 214 is turned off. Specifically, the specified reverse current duration can be sufficient to allow the negative current to energize a magnetizing inductance of the transformer 206 to discharge an equivalent capacitance of the primary FET 212 before the primary FET 212 is turned off. In some embodiments, the equivalent capacitance of the primary FET 212 is discharged to zero before the primary FET 212 is turned on to facilitate zero voltage switching (ZVS) of the primary FET 212. As shown in the example of FIG. 5, the drive signal 537 is on for a specified reverse current duration 535 (e.g., reverse current on-time), which allows a negative current 539 to build up in the synchronous rectifier 214.

The reverse current duration may be determined based on parameters of components of the converter 200. For example, when an equivalent capacitance (CEQ) of the primary FET 212 is 50 pF, an inductance of the primary winding 208 of the transformer 206 is 110 uH, a drain voltage of the primary FET 212 is 430 V, a number of primary turn of the transformer 206 is twenty one, and a number of secondary turns of the transformer 206 is four, an energy of the equivalent capacitance of the primary FET 212 is 4.623 uJ. In this case, a calculated required peak reverse current in the secondary winding 210 is 1.522 A, and a calculated specified reverse current duration is 304 ns.

Once the specified reverse current duration ends, a ZVS delay circuit 436 waits for a specified ZVS delay duration 541 before turning on the primary FET 212, to facilitate zero-voltage switching of the primary FET 212. The specified ZVS delay duration may correspond to a time period required for a voltage (Vinput+Vreflected) to discharge to zero to allow the primary FET 212 to be turned on with ZVS. The peak detect delay circuit 428, the valley skipping circuit 430, the reverse current on-time delay circuit 434 and the ZVS delay circuit 436 may be considered as a means for operating the primary FET 212 in a valley skipping mode, and generating a negative current through the synchronous rectifier 214.

An on-period of the primary FET 212 may be determined based on a feedback loop control signal (FB) and a peak-by-peak limit of a current sense input (CS). Both inputs FB and CS are supplied to a comparator U4, and the comparator U4 is configured to reset a control cycle of the primary control circuit 220.

FIG. 6 illustrates an isolated DC-DC flyback converter 600 according to another example embodiment of the present disclosure. The converter 600 includes an input 602, an output 604, and a transformer 606 coupled between the input 602 and the output 604. The converter 600 also includes a primary field-effect transistor (FET) 612 and a synchronous rectifier 614. The synchronous rectifier 614 includes a drain 616 that experiences multiple resonant voltage valleys during each dead-time period of the converter 600.

As shown in FIG. 6, the converter 600 further includes a first delay circuit block 648, a second delay circuit block 650, and a third delay circuit block 652. The first delay circuit block 648 is coupled to receive a zero-current detection (ZCD) signal of the voltage on the transformer 606, and to wait a specified peak delay period before outputting a peak delay signal.

The second delay circuit block 650 is coupled between the first delay circuit block 648 and the primary FET 612. The second delay circuit block 650 is configured to wait a specified reverse current duration and a specified ZVS delay duration after receiving the peak delay signal from the first delay circuit block 648, before turning on the primary FET 612.

The third delay circuit block 652 is coupled between the first delay circuit block 648 and the synchronous rectifier drive circuit 618. The third delay circuit block 652 is configured to wait a specified reverse current duration after receiving the peak delay signal from the first delay circuit block 648 before transmitting the drive signal to the synchronous rectifier drive circuit 618.

The converter 600 includes an isolation transformer 622 coupled between the third delay circuit block 552 and the synchronous rectifier drive circuit 618. The third delay circuit block 652 is configured to transmit the drive signal through the isolation transformer 622 to the synchronous rectifier drive circuit 618.

In some cases, the first delay circuit block 648, the second delay circuit block 650 and the third delay circuit block 652 may be considered as a means for operating the primary FET 612 in a valley skipping mode, and generating a negative current through the synchronous rectifier 614.

An isolated DC-DC flyback power converter according to another example embodiment of the present disclosure is illustrated in FIG. 7 and indicated generally by reference number 700. The converter 700 includes an input 702, an output 704, and a transformer 706 coupled between the input 702 and the output 704. The transformer 706 has a primary winding 708 and a secondary winding 710.

The converter 700 also includes a primary field-effect transistor (FET) 712, and a synchronous rectifier 716. The primary FET 712 includes a drain 714 that experiences multiple resonant voltage valleys during each dead-time period of the converter. The primary FET 712 is configured to operate in a valley skipping mode by turning on during a second or subsequent one of the multiple resonant voltage valleys during each dead-time period of the converter 700. For example, the primary FET 712 could be turned on during a second valley, a third valley, a fourth valley, etc.

As shown in FIG. 7, the converter 700 includes a control circuit 718. The control circuit 718 is configured to allow a negative current in the secondary winding 710 of the transformer 706 before turning off the synchronous rectifier 716 during one or more of the multiple resonant voltage valleys.

Although FIG. 7 illustrates only a portion of the control circuit 718 coupled to the secondary side of the converter 200 and the synchronous rectifier 716, the control circuit 718 may control the primary FET 712 in any suitable control implementation.

Referring back to FIG. 7, the control circuit includes a delay circuit 722 having a resistor R1 coupled with a capacitor C1. In this case, the control circuit 718 is configured to allow the negative current by waiting a specified delay period after detecting a zero current in the secondary winding 710 of the transformer 706 before turning off the synchronous rectifier 716. The specified delay period for turning off the synchronous rectifier 716 can be determined based on values of the resistor R1 and the capacitor C1.

The delay circuit 722 includes a delay switch Q4 coupled with the capacitor C1 to selectively turn on and turn off the delay circuit 722. For example, the delay switch Q4 may introduce the specified delay period to the control circuit 718 when the switch Q4 is turned on, and may remove the specified delay period when the switch Q4 is turned off.

A selection switch Q3 is coupled between the output 704 and the delay switch Q4 to selectively turn on and turn off the delay switch Q4. In this manner, the selection switch Q3 can introduce the specified delay period during one or more of the multiple resonant voltage valleys, in response to a load condition at the output 704.

For example, the selection switch Q3 is coupled to the output 704 in a resistor network including resistors R5, R6 and R7, and is coupled to a gate of the delay switch Q4 at a node that is grounded through resistor R3. Values of the resistors R3, R5, R6 and R7 may specify a load condition at which the selection switch Q3 will turn on the delay circuit 722.

As shown in FIG. 2, the control circuit 718 includes an integrated circuit (SR IC) configured to detect a zero current in the secondary winding 710. In response to detecting the zero current, the integrated circuit (SR IC) outputs a control signal to turn off the synchronous rectifier 716.

For example, the integrated circuit (SR IC) may detect the zero current by sensing a voltage across a drain of the synchronous rectifier 716. In some cases, the integrated circuit may only detect positive current and may turn off at zero current. A diode D1 is coupled in parallel with the resistor R1 to inhibit turn-on delay but provide a turn-off delay to a driver circuit (DRV IC) input.

The delay circuit 722 is coupled between the integrated circuit (SR IC) and the synchronous rectifier 716 to introduce the specified delay period in response to the integrated circuit (SR IC) outputting the control signal to turn off the synchronous rectifier 214. For example, the delay circuit 722 can delay the turn off signal from the integrated circuit (SR IC) to the synchronous rectifier 716 when the delay switch Q4 is turned on.

The control circuit 718 also includes driver circuit (DRV IC) coupled to receive a signal from the delay circuit 722 and drive the synchronous rectifier 716. The driver circuit (DRV IC) is coupled to the synchronous rectifier 716 via a resistor R2, and has one pin coupled to ground through a capacitor C2.

Once an output of the integrated circuit (SR IC) goes low, the capacitor C1 is discharged through the resistor R1. The time period for the capacitor C1 to discharge below a turn-off threshold of an input of the driver circuit (DRV IC) corresponds to the specified delay period, and causes a delay in the driver circuit (DRV IC) turning off the synchronous rectifier 716.

The converter 700 optionally includes an input capacitor CIN coupled with the input 702, and an output capacitor CO coupled with the output 704. The input 702 and output 704 may include any suitable wires, terminals, electrical connectors, etc. for connecting with a voltage source, a load, etc.

In some embodiments, and as explained further below, the specified delay period may be sufficient to allow a negative current in the synchronous rectifier 716 before the synchronous rectifier 716 is turned off. For example, the negative current can energize a magnetizing inductance of the transformer 706 to discharge an equivalent capacitance of the primary FET 712 before the primary FET 712 is turned on. In some cases, the equivalent capacitance of the primary FET 712 is discharged to zero before the primary FET 712 is turned on to facilitate zero voltage switching (ZVS) of the primary FET 712.

An isolated DC-DC flyback power converter according to another example embodiment of the present disclosure is illustrated in FIG. 8 and indicated generally by reference number 800. The converter 800 includes an input 802, an output 804, and a transformer 806 coupled between the input 802 and the output 804. The transformer 806 has a primary winding 808 and a secondary winding 810.

The converter 800 also includes a primary field-effect transistor (FET) 812, and a synchronous rectifier 816. The primary FET 812 includes a drain 814 that experiences multiple resonant voltage valleys during each dead-time period of the converter. The primary FET 812 is configured to operate in a valley skipping mode by turning on during a second or subsequent one of the multiple resonant voltage valleys during each dead-time period of the converter 800.

As shown in FIG. 8, the converter 800 also includes a control circuit 818. The control circuit 818 is configured to detect a positive current in the secondary winding 810 by sensing a voltage across the drain of the synchronous rectifier 816, turn on the synchronous rectifier 816 via the DRIVER IC, and selectively allow a negative current in the secondary winding 810 by using hysteresis to turn off the synchronous rectifier 816.

The control circuit 818 includes a comparator U1 having a first hysteresis threshold and a different second hysteresis threshold. In this case, a value of negative current through the synchronous rectifier 816 is determined based on a value of one of the two different hysteresis thresholds.

The converter 800 also includes a selection switch S1 coupled between the output 804 and the comparator U1 to select between the first and second hysteresis thresholds. For example, one hysteresis threshold (e.g., turn-off hysteresis threshold) may allow the negative current through the synchronous rectifier 816 when a selection switch S1 is turned on, and another hysteresis threshold may not allow the negative current through the synchronous rectifier 816 when the selection switch S1 is turned off. This allows the selection switch S1 to introduce the negative current through the synchronous rectifier 816 during one or more of the multiple resonant voltage valleys, in response to a load condition at the output 804.

For example, the selection switch S1 is controlled by a comparator U2, which receives an input from a voltage reference V2 and a resistor R4. The selection switch S1 is connected with the comparator U1 through the resistors R2 and R3. Further, the comparator is connected to a voltage regulation reference VREG through a node coupled to a resistor R7, a resistor R6 and a resistor R1. The values of the resistors R1-R7 and the voltage references V2 and VREG may specify a load condition at which the selection switch S1 will alternate between hysteresis thresholds of the comparator U1, thereby enabling or disabling the negative current through the synchronous rectifier 816.

An isolated DC-DC flyback power converter according to another example embodiment of the present disclosure is illustrated in FIG. 9 and indicated generally by reference number 900. The converter 900 includes an input 902, an output 904, and a transformer 906 coupled between the input 902 and the output 904.

The converter 900 also includes a primary field-effect transistor (FET) 912 coupled between the input 902 and the primary winding 908 of the transformer 906, and a synchronous rectifier 916 coupled between the output 904 and the secondary winding 910 of the transformer 906.

As shown in FIG. 9, the converter 900 also includes a control circuit 918. The control circuit 918 can be packaged as a single application-specific integrated circuit (ASIC). The control circuit 918 includes two comparators U1 and U2. V1 is a drain-sensing turn-on threshold, while V2 is a drain sensing turn-off threshold. In this case, V2 is used when the switch S2 is on and the switch S3 is off, and a zero voltage threshold is used when the switch S2 is off and the switch S3 is on.

The triggers for the switches S2 and S3 are opposite one another, and an input signal is received from outside the ASIC. If the trigger is high, the switch S2 is turned on and the switch S3 is turned off. If the trigger is low, the switch S2 is turned off and the switch S3 is turned on. When the V2 threshold is active, negative current is allowed in the synchronous rectifier 916. When the switch S2 is off and the switch S3 is on, drain-sensing will turn off the synchronous rectifier 916 at zero current.

As described herein, the example control circuits may include a microprocessor, microcontroller, integrated circuit, digital signal processor, etc., which may include memory. The control circuits may be configured to perform (e.g., operable to perform, etc.) any of the example processes described herein using any suitable hardware and/or software implementation. For example, the control circuits may execute computer-executable instructions stored in a memory, may include one or more logic gates, control circuitry, etc.

According to another example embodiment, a method of operating an DC-DC power converter is disclosed. The converter includes an input, an output, and a transformer coupled between the input and the output. The transformer has a primary winding and a secondary winding. The converter also includes a primary field-effect transistor (FET) coupled to selectively conduct current though the primary winding, and a synchronous rectifier coupled to selectively conduct current through the secondary winding. The synchronous rectifier includes a drain that experiences multiple resonant voltage valleys during each dead-time period of the converter. The converter further includes a primary control circuit and a synchronous rectifier drive circuit.

The method includes operating, by the primary control circuit, the primary FET in a valley skipping mode, and transmitting, by the primary control circuit, a drive signal to the synchronous rectifier drive circuit to turn on the synchronous rectifier during a specified one of the multiple resonant voltage valleys to generate a negative current through the synchronous rectifier.

The converter may include an isolator coupled between the primary control circuit and the synchronous rectifier drive circuit. In that case, transmitting the drive signal includes transmitting the drive signal through the isolator to the synchronous rectifier drive circuit.

In some embodiments, the method further includes detecting a peak voltage on the drain of the primary FET, and delaying transmitting the drive signal to the synchronous rectifier drive circuit for a peak delay period after detecting the peak voltage to turn on the synchronous rectifier during the last one of the multiple resonant voltage valleys. The method may include inhibiting transmission of the drive signal to the synchronous rectifier drive circuit until the specified one of the multiple resonant voltage valleys occurs. Alternatively, or additionally, the method may include waiting for a specified ZVS delay duration after the synchronous rectifier is turned off before turning on the primary FET, to facilitate zero-voltage switching of the primary FET.

Transmitting the drive signal can include transmitting the drive signal to the synchronous rectifier drive circuit for a specified reverse current duration. In some cases, the specified reverse current duration is sufficient to allow the negative current to energize a magnetizing inductance of the transformer to discharge an equivalent capacitance of the primary FET before the primary FET is turned on. For example, the equivalent capacitance of the primary FET may be discharged to zero before the primary FET is turned on to facilitate zero voltage switching (ZVS) of the primary FET.

Example embodiments described herein may be used in any suitable converter topology and mode of operation, including a quasi-resonant flyback converter operated in a frequency foldback mode. For example, the converter may include a variable frequency flyback converter (commonly known as quasi-resonant), that operates at a lower frequency during a full-load condition and increases operating frequency as the load decreases. Frequency foldback operation can be used to inhibit the converter from operating at a very high frequency during light loads. In some cases, the frequency foldback mode may be implemented using valley skipping operation for turn-on of the primary FET, where the primary FET is turned on during a second or subsequent one of multiple resonant voltage valleys experienced at a drain of the MOSFET during a dead-time period of the converter.

In some embodiments, the converter may include a critically-discontinuous mode flyback converter with synchronous rectification and a resistor-capacitor-diode (RCD) snubber, a critically-discontinuous mode flyback converter with synchronous rectification and an inductor-capacitor-diode (LCD) non-dissipative snubber, a critically-discontinuous mode buck-boost converter with synchronous rectification, etc.

Example embodiments described herein may provide one or more (or none) of the following advantages: increased efficiency of DC/DC converters, reduction of primary switch turn-on losses (e.g., when the converter is operating in a frequency-foldback, multiple valley-skipping mode), a smaller primary switch package due to reduced power dissipation, a smaller heatsink on a primary switch due to reduced power dissipation, reduced packaging density, reduced noise (e.g., dV/dt) during primary switch turn-on, improved electromagnetic interference (EMI), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A DC-DC power converter, comprising:
an input for receiving a DC input voltage from a voltage source;
an output for supplying a DC output voltage to a load;
a transformer coupled between the input and the output, the transformer having a primary winding and a secondary winding;
a primary field-effect transistor (FET) coupled to selectively conduct current through the primary winding of the transformer;
a synchronous rectifier coupled to selectively conduct current through the secondary winding of the transformer, the synchronous rectifier including a drain that experiences multiple resonant voltage valleys during each dead-time period of the converter;

a synchronous rectifier drive circuit configured to turn on and turn off the synchronous rectifier; and
a primary control circuit configured to operate the primary FET in a valley skipping mode, and to transmit a drive signal to the synchronous rectifier drive circuit to turn on the synchronous rectifier during a specified one of the multiple resonant voltage valleys to generate a negative current through the synchronous rectifier.

2. The converter of claim 1, further comprising an isolator coupled between the primary control circuit and the synchronous rectifier drive circuit, the primary control circuit configured to transmit the drive signal through the isolator to the synchronous rectifier drive circuit.

3. The converter of claim 2, further comprising:
a logical OR-gate having a first input and a second input; and
an integrated circuit having an input coupled to detect a current of the secondary winding of the transformer and an output coupled to transmit a control signal to turn on and turn off the synchronous rectifier according to the detected current, wherein:
the control signal output by the integrated circuit is supplied to the first input of the logical OR-gate; and
the drive signal transmitted by the primary control circuit is supplied to the second input of the logical OR-gate.

4. The converter of claim 1, wherein the primary control circuit includes a peak detect delay circuit configured to detect a peak voltage on at least one of the primary winding of the transformer, a drain of the primary FET and an auxiliary winding of the transformer, and to transmit the drive signal to the synchronous rectifier drive circuit in response to detecting the peak voltage in order to turn on the synchronous rectifier during the specified one of the multiple resonant voltage valleys.

5. The converter of claim 1, wherein the primary control circuit includes a valley skipping circuit configured to inhibit transmission of the drive signal to the synchronous rectifier drive circuit until the specified one of the multiple resonant voltage valleys occurs.

6. The converter of claim 1, wherein the primary control circuit includes a ZVS delay circuit configured to wait for a specified ZVS delay duration after the synchronous rectifier is turned off before turning on the primary FET, to facilitate zero-voltage switching of the primary FET.

7. The converter of claim 1, wherein the primary control circuit includes a reverse current delay circuit configured to transmit the drive signal to the synchronous rectifier drive circuit for a specified reverse current duration.

8. The converter of claim 7, wherein the specified reverse current duration is sufficient to build up the negative current in the synchronous rectifier to a specified value before the synchronous rectifier is turned off.

9. The converter of claim 8, wherein the specified reverse current duration is sufficient to allow the negative current to energize a magnetizing inductance of the transformer to discharge an equivalent capacitance of the primary FET before the primary FET is turned on.

10. The converter of claim 1, wherein:
the primary control circuit includes a first delay circuit block, a second delay circuit block, and a third delay circuit block;
the first delay circuit block is coupled to receive a zero-current detection (ZCD) signal of the voltage on at least one of the primary winding of the transformer, a drain of the primary FET and an auxiliary winding, and wait a specified peak delay period before outputting a peak delay signal;

the second delay circuit block is configured to wait a specified reverse current duration and a specified ZVS delay duration after receiving the peak delay signal from the first delay circuit before turning on the primary FET; and
the third delay circuit block is configured to transmit the drive signal to the synchronous rectifier drive circuit for the specified reverse current duration, after receiving the peak delay signal from the first delay circuit.

11. The converter of claim 1, wherein
the control circuit is configured to operate the converter in a quasi-resonant mode including frequency foldback.

12. A method of operating a DC-DC power converter, the converter including an input, an output, a transformer coupled between the input and the output, the transformer having a primary winding and a secondary winding, a primary field-effect transistor (FET) coupled to selectively conduct current through the primary winding, a synchronous rectifier coupled to selectively conduct current through the secondary winding, the synchronous rectifier including a drain that experiences multiple resonant voltage valleys during each dead-time period of the converter, a primary control circuit and a synchronous rectifier drive circuit, the method comprising:
operating, by the primary control circuit, the primary FET in a valley skipping mode; and
transmitting, by the primary control circuit, a drive signal to the synchronous rectifier drive circuit to turn on the synchronous rectifier during a specified one of the multiple resonant voltage valleys to generate a negative current through the synchronous rectifier.

13. The method of claim 12, wherein:
the converter includes an isolator coupled between the primary control circuit and the synchronous rectifier drive circuit; and
transmitting the drive signal includes transmitting the drive signal through the isolator to the synchronous rectifier drive circuit.

14. The method of claim 12, further comprising:
detecting a peak voltage on a drain of the primary FET; and
transmitting the drive signal to the synchronous rectifier drive circuit for a specified reverse current duration after detecting the peak voltage on the drain of the primary FET to turn on the synchronous rectifier during the last one of the multiple resonant voltage valleys.

15. The method of claim 12, further comprising inhibiting transmission of the drive signal to the synchronous rectifier drive circuit until the specified one of the multiple resonant voltage valleys occurs.

16. The method of claim 12, further comprising waiting for a specified ZVS delay duration after the synchronous rectifier is turned off before turning on the primary FET, to facilitate zero-voltage switching of the primary FET.

17. The method of claim 12, wherein transmitting the drive signal includes transmitting the drive signal to the synchronous rectifier drive circuit for a specified reverse current duration.

18. The method of claim 17, wherein the specified reverse current duration is sufficient to allow the negative current to energize a magnetizing inductance of the transformer to discharge an equivalent capacitance of the primary FET before the primary FET is turned on.

19. The method of claim 18, wherein operating the primary FET in a valley skipping mode includes discharging the equivalent capacitance of the primary FET to zero before turning on the primary FET to facilitate zero voltage switching (ZVS) of the primary FET.

20. A DC-DC power converter, comprising:
- an input for receiving an a DC input voltage from a voltage source;
- an output for supplying an a DC output voltage to a load;
- a transformer coupled between the input and the output, the transformer having a primary winding and a secondary winding;
- a primary field-effect transistor (FET) coupled to selectively conduct current through the primary winding of the transformer, the primary FET including a drain that experiences multiple resonant voltage valleys during each dead-time period of the converter;
- a synchronous rectifier coupled to selectively conduct current through the secondary winding of the transformer; and
- means for operating the primary FET in a valley skipping mode by turning on the primary FET during a second or subsequent one of multiple resonant voltage valleys during each dead-time period of the converter, and generating a negative current in the secondary winding of the transformer during one or more of the multiple resonant voltage valleys during each dead-time period of the converter.

21. The converter of claim 2, wherein the isolator includes a transformer.

22. The converter of claim 9, wherein the primary control circuit includes a ZVS delay circuit configured to wait until the equivalent capacitance of the primary FET is discharged to zero before turning on the primary FET to facilitate zero voltage switching (ZVS) of the primary FET.

23. The converter of claim 1, wherein the converter includes only one primary FET and only one synchronous rectifier.

* * * * *